United States Patent
Nie et al.

(10) Patent No.: US 8,064,677 B2
(45) Date of Patent: Nov. 22, 2011

(54) SYSTEMS AND METHODS FOR MEASUREMENT OF OBJECTS OF INTEREST IN MEDICAL IMAGES

(75) Inventors: Yao Nie, Sunnyvale, CA (US); Chao Shi, San Jose, CA (US); Nariman Majdi-Nasab, San Jose, CA (US); Akira Hasegawa, Saratoga, CA (US)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/626,608

(22) Filed: Nov. 25, 2009

(65) Prior Publication Data
US 2011/0123087 A1    May 26, 2011

(51) Int. Cl.
*G06K 9/00* (2006.01)
(52) U.S. Cl. ........................................ 382/132
(58) Field of Classification Search ........... 382/128–132
See application file for complete search history.

(56) References Cited

U.S. PATENT DOCUMENTS

| | | | | |
|---|---|---|---|---|
| 6,075,879 | A * | 6/2000 | Roehrig et al. | 382/132 |
| 6,389,157 | B2 * | 5/2002 | Rogers et al. | 382/132 |
| 7,124,760 | B2 * | 10/2006 | Wong | 128/897 |
| 7,556,602 | B2 * | 7/2009 | Wang et al. | 600/437 |
| 2003/0194121 | A1 * | 10/2003 | Eberhard et al. | 382/132 |
| 2004/0267122 | A1 * | 12/2004 | Nadadur et al. | 600/440 |
| 2005/0096530 | A1 * | 5/2005 | Daw et al. | 600/408 |
| 2007/0274578 | A1 * | 11/2007 | Doi et al. | 382/128 |
| 2007/0280525 | A1 * | 12/2007 | Basilico et al. | 382/132 |
| 2008/0118138 | A1 * | 5/2008 | Zingaretti et al. | 382/132 |

OTHER PUBLICATIONS

S.K. Kinoshita et al., "Radon-domain detection of the nipple and the pectoral muscle in mammograms", J Digit Imaging, Mar. 2008; 21(1): 37-49. Epub Apr. 11, 2007.
M. Karnan et al., "Automatic detection of the breast border and nipple position on digital mammograms using genetic algorithm for asymmetry approach to detection of microcalcifications", Computer Methods and Programs in Biomedicine, vol. 87, Issue 1, pp. 12-20, Jul. 2007.
"Guide to Using the ACR Mammography Lexicon with MRS", Mammography Reading System Inc., Seattle, WA, 1996.
S.A. Hojjatoleslami et al., "Automatic detection of calcification in mammograms", Fifth International Conference on Image Processing and its Applications, pp. 139-143, Jul. 4-6, 1995.
D H Davies et al., "Automatic computer detection of clustered calcifications in digital mammograms",Phys. Med. Biol., vol. 35, No. 8, 1111-1118, Aug. 1990.

(Continued)

*Primary Examiner* — Daniel Mariam
(74) *Attorney, Agent, or Firm* — Sughrue Mion, PLLC

(57) ABSTRACT

A system and method are provided for the measurement and display of attributes of an object of interest in a medical image. An object of interest is identified, such as a lesion or cluster of lesions in a breast area on a mammography image. At least one attribute of the lesion is then automatically measured, such as the area of the lesion, the width and height of a cluster of lesions, the number of lesions in a cluster, or the distance from one or more lesions to an anatomical feature such as the nipple, skin line or chest wall. The measurements are then displayed to a user, for example by displaying the measurements on the mammography image. Additionally, anatomical zones, such as standard, quadrant and clock zones of the breast area may be determined and displayed on the mammography image or diagram to display the location of the lesion as it corresponds to the zones.

17 Claims, 14 Drawing Sheets

OTHER PUBLICATIONS

S. TIMP et al., "A new 2D segmentation method based on dynamic programming applied to computer aided detection in mammography", Med Phys., 31(5): 958-71, May 2004.

G.M. Te Brake et al., "Single and multiscale detection of masses in digital mammograms", IEEE Trans Med Imaging, 18(7):628-639, Jul. 1999.

* cited by examiner

SYSTEMS AND METHODS FOR MEASUREMENT OF OBJECTS OF INTEREST IN MEDICAL IMAGES

BACKGROUND

1. Field

The systems and methods described below relate to the measurement and display of objects of interest in a medical image, and more specifically to automatic measurement and display of attributes of lesions in mammography images.

2. Background

Medical imaging is the field of creating images of the human body for medical purposes, such as diagnosing or examining disease or other physiological anomalies. Numerous types of image modalities produce medical images, such as magnetic resonance imaging (MRI), radiography (x-rays), computed tomography (CT), ultrasound (US) and others. In medical imaging, an object of interest is usually selected pertaining to an area of the human body, such as the head, heart or chest.

One type of medical imaging is mammography, which is the examination of a medical image of the human breast. Mammography is used to detect breast cancer by examining the breast tissue for abnormalities such as lesions that represent microcalcifications or uncharacteristic masses.

In the process of reading digital mammography images, a user, such as a radiologist, often needs to measure attributes of the lesions, such as the location, size, number and distance from other anatomical features. These measurements are then compiled into a report that describes the radiologist's findings. However, these attributes are measured manually by the radiologist, which slows down the workflow and increases the work load of the radiologist.

The radiologist may also need to identify the location of a lesion in terms of standard zones of a breast area illustrated by the breast diagram 10 depicted in FIG. 1—subareolar zone 12, anterior zone 14, middle zone 16 and posterior zone 18. FIG. 1 depicts a left and right breast, but only the breast on the right side of the image is labeled in the figure. Similar labels apply for the breast on the left side. FIG. 1 also illustrates a breast diagram as seen from a cranio-caudal (CC) view, where the breast area can be further classified into a lateral zone 20, central zone 22 and medial zone 24. In a medio-lateral (ML) or medio-lateral oblique (MLO) view of a breast area depicted by the breast diagram 26 shown in FIG. 2, the lesion can be further classified as belonging to a superior zone 28 or inferior zone 30. Furthermore, the radiologist may want to determine a quadrant and clock location of a lesion when both the CC and ML/MLO view images are available, as illustrated by the breast diagram 32 in FIG. 3 of a left breast 32a and right breast 32b. The quadrant locations in a quadrant/clock location diagram are upper outer 34, upper inner 36, lower outer 38 and lower inner 40, and the clock positions 42 correspond to a conventional analog clock face, with positions ranging from 1-12.

For all of the illustrated lesion location schemes, the radiologist must manually determine the zones, quadrant and clock positions on the breast area of a mammography image and then determine which zone, quadrant and clock position the lesion falls into. If the lesion is palpable, the position of the lesion can be determined directly on the breast. Otherwise, using the nipple's location as the reference, the radiologist can determine whether a lesion is in the inner or outer zone in the breast by checking the position of the lesion in the CC view image; and determine whether a lesion is in the upper or lower zone by checking the position of the lesion in the ML/MLO view image. Then the quadrant can be determined jointly from the upper/lower and outer/inner position. After determining the quadrant, the radiologist can further estimate the clock position by checking whether the lesion is closer to the uppermost (lowermost) or innermost (outermost) part of the breast. The process is time consuming. Moreover, as the radiologist interprets the location information from two projection images empirically, the results may have a high inter-person variation.

Thus, there is an unmet need to develop systems and methods for effectively and efficiently measuring and displaying attributes of lesions or other objects of interest in medical images.

SUMMARY

Various embodiments of the invention relate to systems and methods for the measurement and display of attributes of an object of interest in a medical image. An object of interest is identified, such as a lesion or cluster of lesions in a breast area on a mammography image. At least one attribute of the lesion is then automatically measured, such as the area of the lesion, the width and height of a cluster of lesions, the number of lesions in a cluster, or the distance from one or more lesions to an anatomical feature such as the nipple, skin line or chest wall. The measurements are then displayed to a user, for example by mapping the measurements onto the mammography image. Additionally, anatomical zones, such as standard, quadrant and clock zones of the breast area may be determined and mapped onto the mammography image to display the location of the lesion as it corresponds to the zones. The measurements and the anatomical zone information can also be recorded and put into document files, such as a word processing template for a mammography reading report, which can be printed out later for viewing.

One embodiment of the invention relates to a method for measurement of an object of interest in a medical image, comprising identifying at least one object of interest in a medical image; automatically measuring at least one attribute of the object of interest; and displaying the measurements of the at least one attribute.

In another embodiment of the invention, the measurements are displayed on a report.

In another embodiment of the invention, the measurements are displayed on the medical image.

In another embodiment of the invention, the measurements are displayed on an anatomical diagram.

In another embodiment of the invention, the object of interest is a lesion in a breast area in a mammography image.

In another embodiment of the invention, the at least one attribute includes a distance from the lesion to at least one anatomical feature.

In another embodiment of the invention, the method further comprises determining standard zones of the breast area and displaying a location of the lesion on a standard zones diagram.

In another embodiment of the invention, the method further comprises determining quadrant and clock zones of the breast area and displaying a location of the lesion on a quadrant and clock zone diagram.

In another embodiment of the invention, the method further comprises determining standard zones of the breast area and displaying the standard zones of the breast area onto the mammography image to display the location of the lesion with respect to the standard zones on the mammography image.

In another embodiment of the invention, the measurements are recorded into a document file.

In another embodiment of the invention, the at least one attribute includes an area of at least one lesion.

In another embodiment of the invention, the at least one attribute includes a width and height of a cluster of lesions.

In another embodiment of the invention, the at least one attribute includes the number of lesions in a cluster of lesions.

In another embodiment of the invention, the location of the lesion with respect to the standard zones is recorded to a document file.

In another embodiment of the invention, the method further comprises determining quadrant and clock zones of the breast area and displaying the quadrant and clock zones of the breast area onto the mammography image to display the location of the lesion with respect to the quadrant and clock zones on the mammography image.

In another embodiment of the invention, the location of the lesion with respect to the quadrant and clock zones is recorded to a document file.

Embodiments of the invention also relate to a system for measurement of an object of interest in a medical image, comprising an identification unit which identifies at least one object of interest in a medical image; and a measurement unit which automatically measures at least one attribute of the object of interest.

In another embodiment of the invention, the system further comprises a display unit which displays the measurements of the at least one attribute.

In another embodiment of the invention, the system further comprises a recording unit which records the measurements of the at least on attribute to a document file.

In another embodiment of the invention, the measurements are displayed onto the medical image.

In another embodiment of the invention, the measurements are displayed on an anatomical diagram.

In another embodiment of the invention, the object of interest is a lesion in a breast area in a mammography image.

In another embodiment of the invention, the at least one attribute includes an area of at least one lesion.

In another embodiment of the invention, the at least one attribute includes a width and height of a cluster of lesions.

In another embodiment of the invention, the at least one attribute includes the number of lesions in a cluster of lesions.

In another embodiment of the invention, the at least one attribute includes a distance from the lesion area to at least one anatomical feature.

In another embodiment of the invention, the measurement unit further determines standard zones of the breast area, and wherein the mapping unit maps the standard zones of the breast area onto the mammography image to display the location of the lesion on the mammography image with respect to the standard zones.

In another embodiment of the invention, the measurement unit displays the location of the lesion on a standard zone diagram.

In another embodiment of the invention, the location of the lesion with respect to the standard zones is recorded to a document file.

In another embodiment of the invention, the measurement unit further determines quadrant and clock zones of the breast area, and wherein the mapping unit maps the quadrant and clock zones of the breast area onto the mammography image to display the location of the lesion on the mammography image with respect to the quadrant and clock zones.

In another embodiment of the invention, the measurement unit displays the location of the lesion on a quadrant and clock zone diagram.

In another embodiment of the invention, the location of the lesion with respect to the quadrant and clock zones is recorded to a document file.

Embodiments of the invention also relate to a computer program product for measurement of an object of interest in a medical image, the computer program product embodied on a computer readable medium and when executed by a computer, performs the method comprising: identifying at least one object of interest in a medical image; automatically measuring at least one attribute of the object of interest; and displaying or recording the measurements of the at least one attribute.

Additional embodiments related to the invention will be set forth in part in the description which follows, and in part will be apparent from the description, or may be learned by practice of the invention. Embodiments of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify various embodiments of the present invention and, together with the description, serve to explain and illustrate principles of the inventive technique. Specifically.

DETAILED DESCRIPTION

Figure 1:
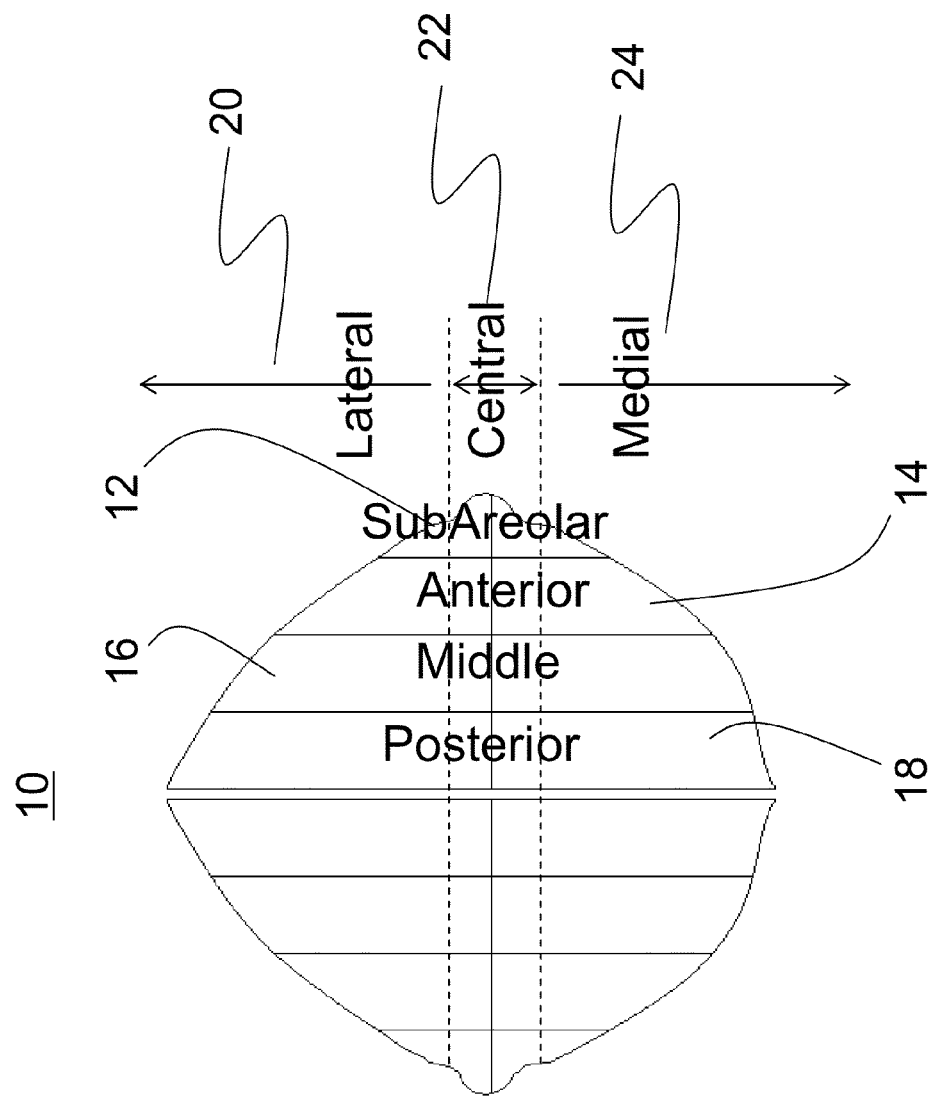
FIG. 1 depicts a diagram of a breast area classification system illustrating the standard zones of the breast area as well as the zones in a cranio-caudal (CC) view, as is known in the art.
Figure 2:
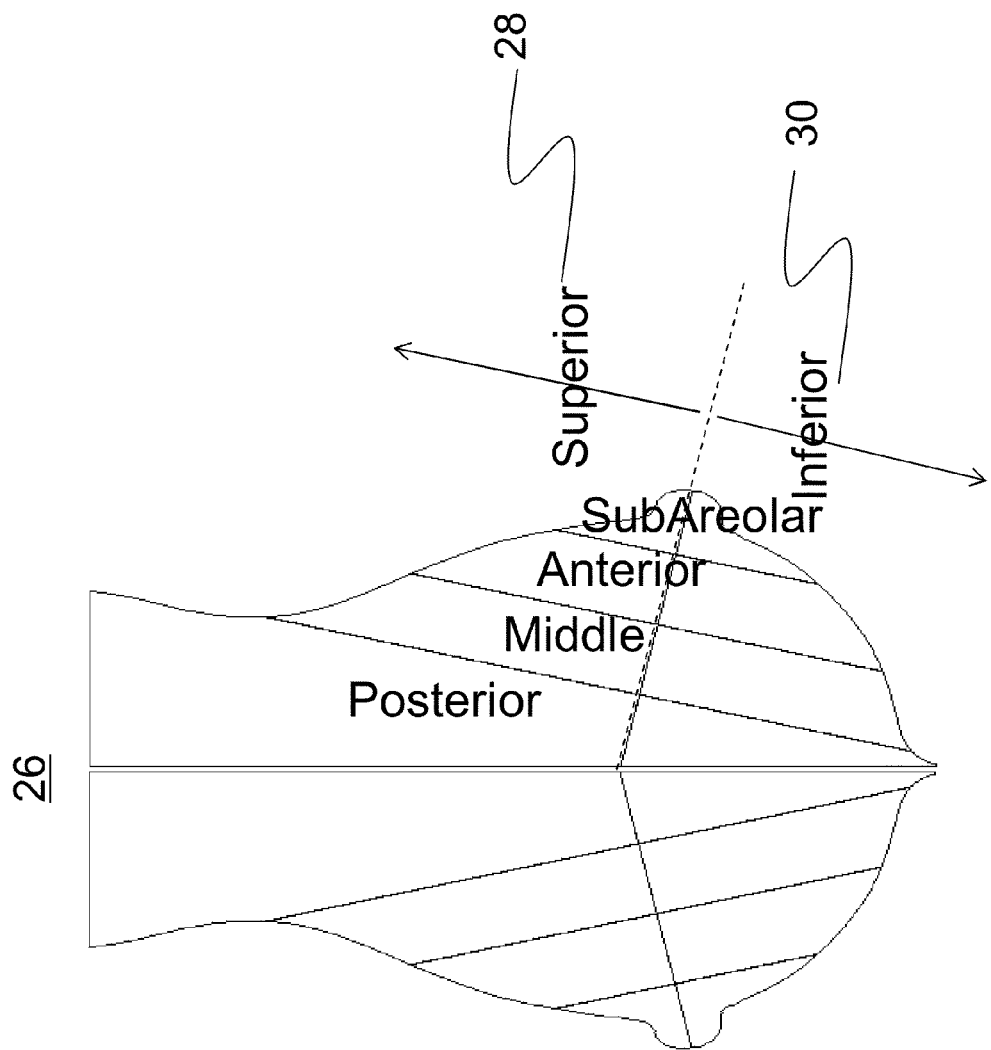
FIG. 2 depicts a diagram of a breast area classification system illustrating the zones of the breast area in a medio-lateral (ML) and medio-lateral oblique (MLO) view, as is known in the art.
Figure 3:
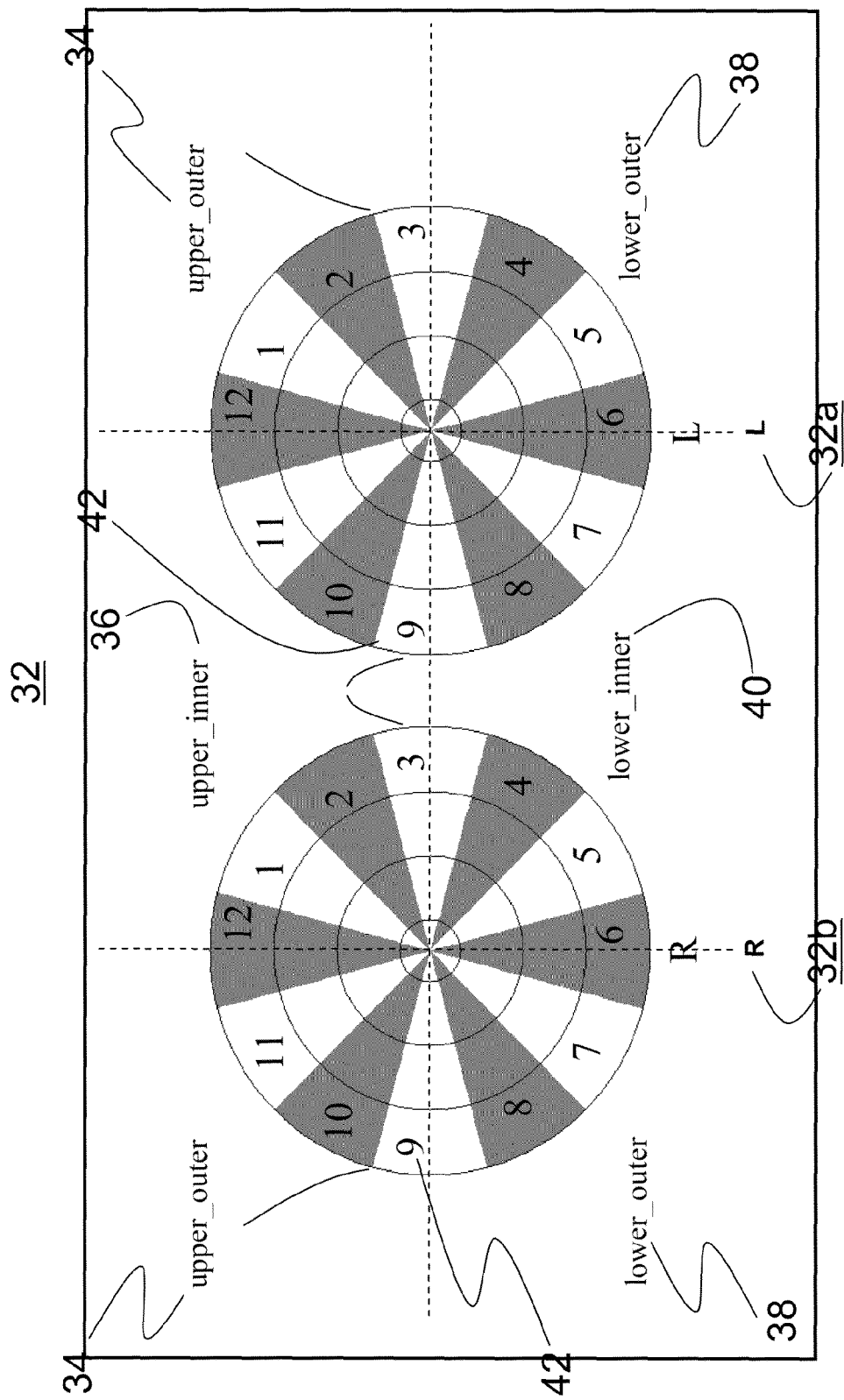
FIG. 3 depicts a diagram of a quadrant and clock location classification system for a breast area in a mammography image, as is known in the art.

In the following detailed description, reference will be made to the accompanying drawing(s), in which identical functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware. Expressions such as "at least one of," when preceding a list of elements, modifies the entire list of elements and does not modify each element of the list.

Various embodiments of the invention relate to systems and methods for the measurement and display of attributes of an object of interest in a medical image. An object of interest is identified, such as a lesion in a breast area on a mammography image. At least one attribute of the lesion is then automatically measured, such as the area of the lesion, the width and height of a cluster of lesions, the number of lesions in a cluster, or the distance from one or more lesions to an anatomical feature such as the nipple, skin line or chest wall. The measurements are then displayed to a user, for example by mapping the measurements onto the mammography image. Additionally, anatomical zones, such as standard, quadrant and clock zones of the breast area may be determined and mapped onto the mammography image to display the location of the lesion as it corresponds to the zones.

By automatically calculating the measurements of the attributes of a lesion, a report with the measurements can be displayed to a user without requiring manual measurement or manual generation of the report. Further, the calculations can be mapped onto the mammography image itself, so the user can more effectively view the calculations as they correspond to the lesion and the other anatomical features of the breast area.

The user viewing the medical image, for example a radiologist, can therefore more clearly view and more accurately identify any potential physiological abnormalities and the attributes of those abnormalities, such as their size and relative position in the breast area. The calculations of the attributes are completed automatically, as is the subsequent display of the calculations, thereby saving significant time for the radiologist.

The inventive systems and methods are applicable to many types of medical imaging, including but not limited to magnetic resonance imaging (MRI), radiography (x-rays), computed tomography (CT) and ultrasound (US).

The following illustrative embodiments pertain to mammography images, but one skilled in the art will appreciate that the methods and systems described herein can be applied to any medical image of any area of the body that a user may want to compare with a related medical image. For any set of medical images, the inventive systems and methods allow the measurement of attributes for any object of interest and the display of those measurements to a user.

Figure 4:
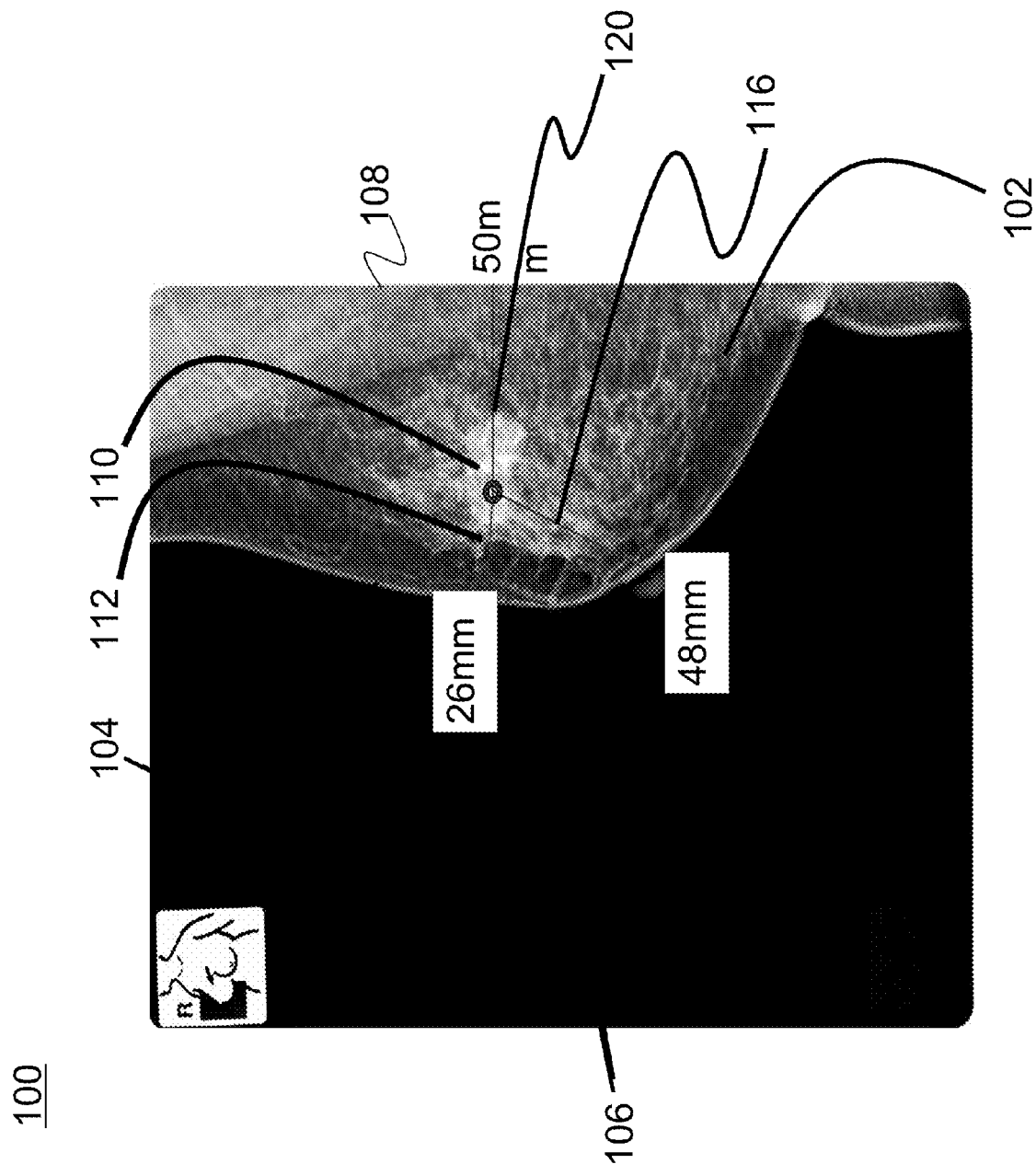
FIG. 4 depicts a mammography image displaying distances measured between a lesion and a plurality of anatomical features, including a skin line, a nipple and a chest wall, according to one embodiment of the invention.

FIG. 4 illustrates a mammography image 100 with a breast area 102 including anatomical features such as a skin line 104, a nipple 106 and a chest wall 108. A lesion 110 is shown in the breast area 102. In one embodiment of the invention, the lesion 110 is identified as the object of interest, after which attributes of the lesion are measured. In this embodiment, the attributes include measuring a distance 112 between the lesion 110 and a skin line 104, the distance 116 between the lesion 110 and a nipple 106, and a distance 120 between the lesion 110 and a chest wall 108. To calculate these distances, the coordinates of the lesion 110 are first provided. The coordinates of the lesion can be given by the user through a computer input device. For example, the user can use a mouse and click on the lesion on the image display. Or the coordinate of the lesion can be found using a computer-aided-detection (CAD) method, such as the method described in "Single and multiscale detection of masses in digital mammograms," to Brake G M, Karssemeijer N. IEEE Trans Med Imaging. 1999 July; 18(7):628-639, the contents of which are incorporated by reference in their entirety. A breast border and nipple detection algorithm may be used to determine the location of the anatomical features such as the skin line 104 (breast border) and nipple 106. An exemplary breast border and nipple position detection algorithm is disclosed in "Automatic detection of the breast border and nipple position on digital mammograms using genetic algorithm for asymmetry approach to detection of microcalcifications," Computer Methods and Programs in Biomedicine, Volume 87, Issue 1 (July 2007), Pages 12-20, incorporated herein in its entirety by reference. In one embodiment, the geometric center of the lesion is used to calculate the distance from the lesion to the other anatomical features, since the lesion may have an inconsistent shape. In another embodiment, the center of the mass can also be used as the measuring point, or the user can provide the measuring point though a computer input device. Once the distances 112 (26 millimeters), 116 (48 millimeters) and 120 (50 millimeters) are calculated, they are displayed on the mammography image and illustrated by distance lines. The point on the skin line or chest wall from which the measurement is taken is the point which has the shortest distance to the measuring point on the lesion. The nipple detection algorithm provides a coordinate to indicate the location of the nipple. This coordinate is used as the measuring point.

The distance to other anatomical land marks, such as a pectoral muscle line or breast end points, can also be measured. In a further embodiment, a user can define an arbitrary point of interest and the distance from the lesion to the arbitrary point of interest can be automatically calculated.

Figure 5:
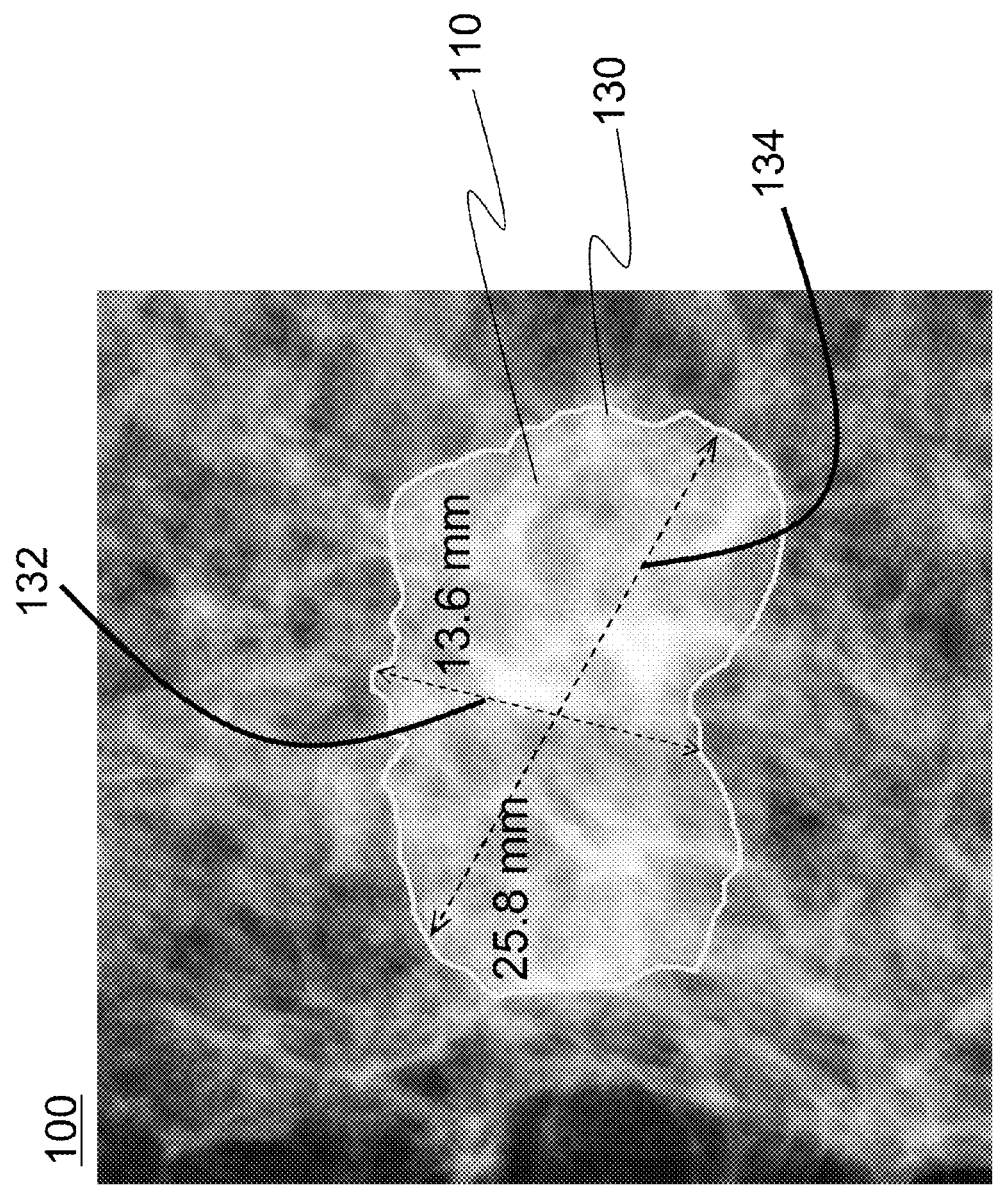
FIG. 5 depicts a mammography image displaying the measurements of a long radius and a short radius of a lesion, according to one embodiment of the invention.

FIG. 5 illustrates another embodiment of the invention, where the size of the lesion 110 can be measured. A border 130 of the lesion 110 is first determined, for example with a lesion segmentation algorithm, such as that disclosed in "A new 2D segmentation method based on dynamic programming applied to computer aided detection in mammography", Med Phys, 2004 May; 31(5): 958-971, the contents of which are incorporated herein by reference in their entirety. Once the border 130 is determined, at least one radius of the lesion is calculated and displayed. The radius can be any line segment inside the lesion 110 that crosses the geometric center of the lesion. In the embodiment illustrated in FIG. 5, a small radius 132 and a large radius 134 are measured, which provides a user with information on the size of the lesion 110. The small radius 132 (13.6 millimeters) and large radius 134 (25.8 millimeters) are then displayed on the mammography image 100 along with corresponding distance lines. The large and small radius can be determined by computing all the radiuses and find the largest and smallest.

In another embodiment (not illustrated), the area of the lesion 110 inside the border 130 can be roughly measured once the radius measurements are determined, using equations for calculating the area of a circle which are known in the art and not described in detail here. The radius or area of the smallest circle that the lesion can fit within can also be determined, as this may be a medically significant measurement in mammography analysis. Other measurements that may be measured include a longest or shortest distance from the border to the center of the lesion.

Figure 6:
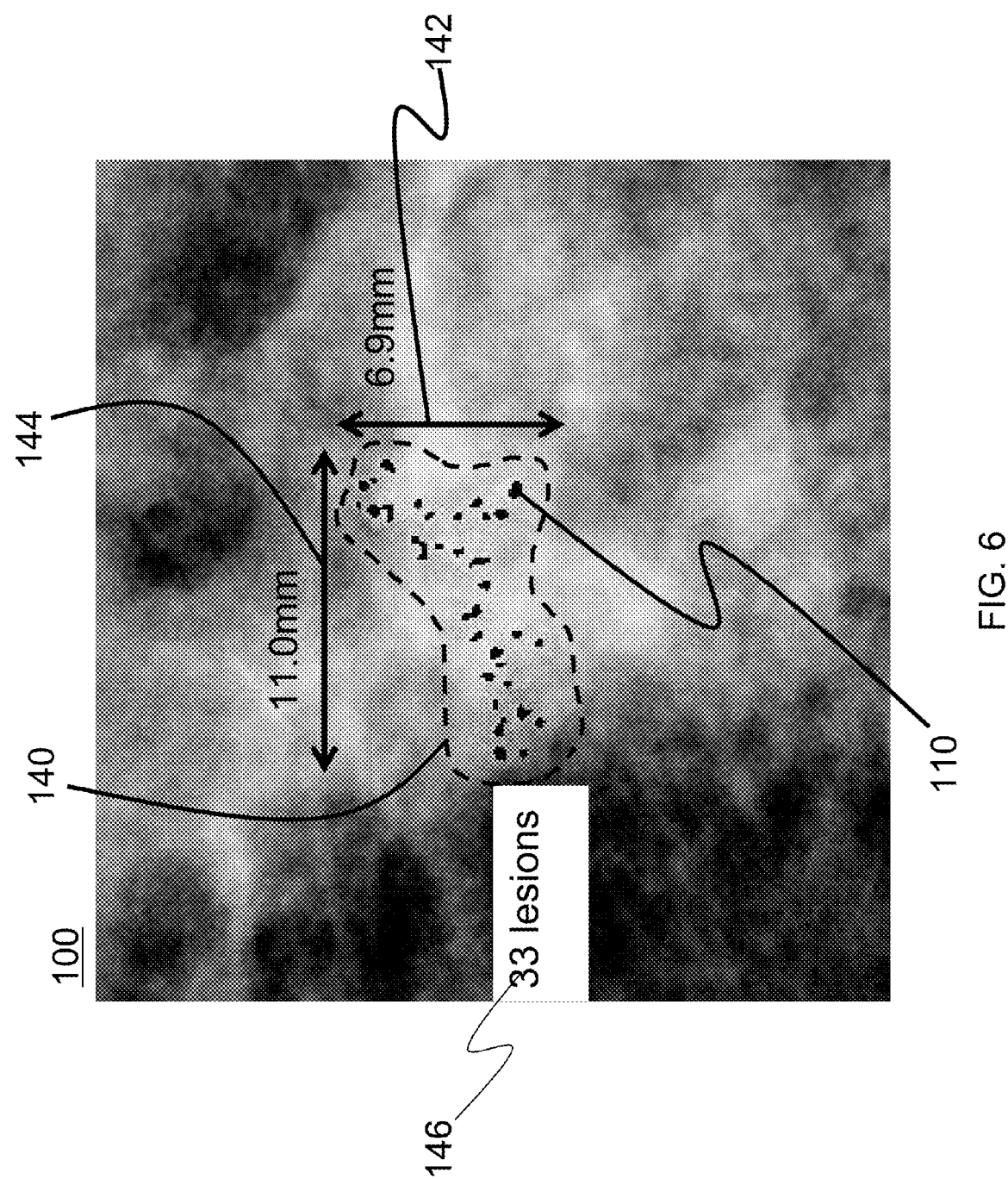
FIG. 6 depicts a mammography image displaying the calculation of a number of lesions in a cluster of lesions, as well as the measurement of a width and height of the cluster of lesions, according to one embodiment of the invention.

FIG. 6 illustrates another embodiment of the invention, where the size of a cluster of lesions 140 can be measured as well as the number of lesions in the cluster 140. The height 142 (6.9 millimeters) and width 144 (11.0 millimeters) of the cluster 140 is measured and displayed on the mammography image 100. In a further embodiment, the lesions 110 within the cluster can be individually identified and counted, and the total number of lesions 146 displayed along with the height and width measurements. In a further embodiment, the number of masses, calcification clusters, or number of total abnormal findings may also be calculated, and the results of the number and type of the abnormal findings can be displayed to demonstrate statistics regarding the number and type of abnormal findings. The calcifications can be automatically detected using the algorithm in the following references: "Automatic detection of calcification in mammogram", Hojjatoleslami, S. A. Kittler, J. Image Processing and its Applications, 1995, Fifth International Conference on, 4-6 Jul. 1995, P 139-143; and "Automatic computer detection of clustered calcifications in digital mammograms", D H Davies et al, 1990 Phys. Med, Biol., 35 1111-1118; the contents of both references being incorporated by reference in their entirety.

Figure 7:
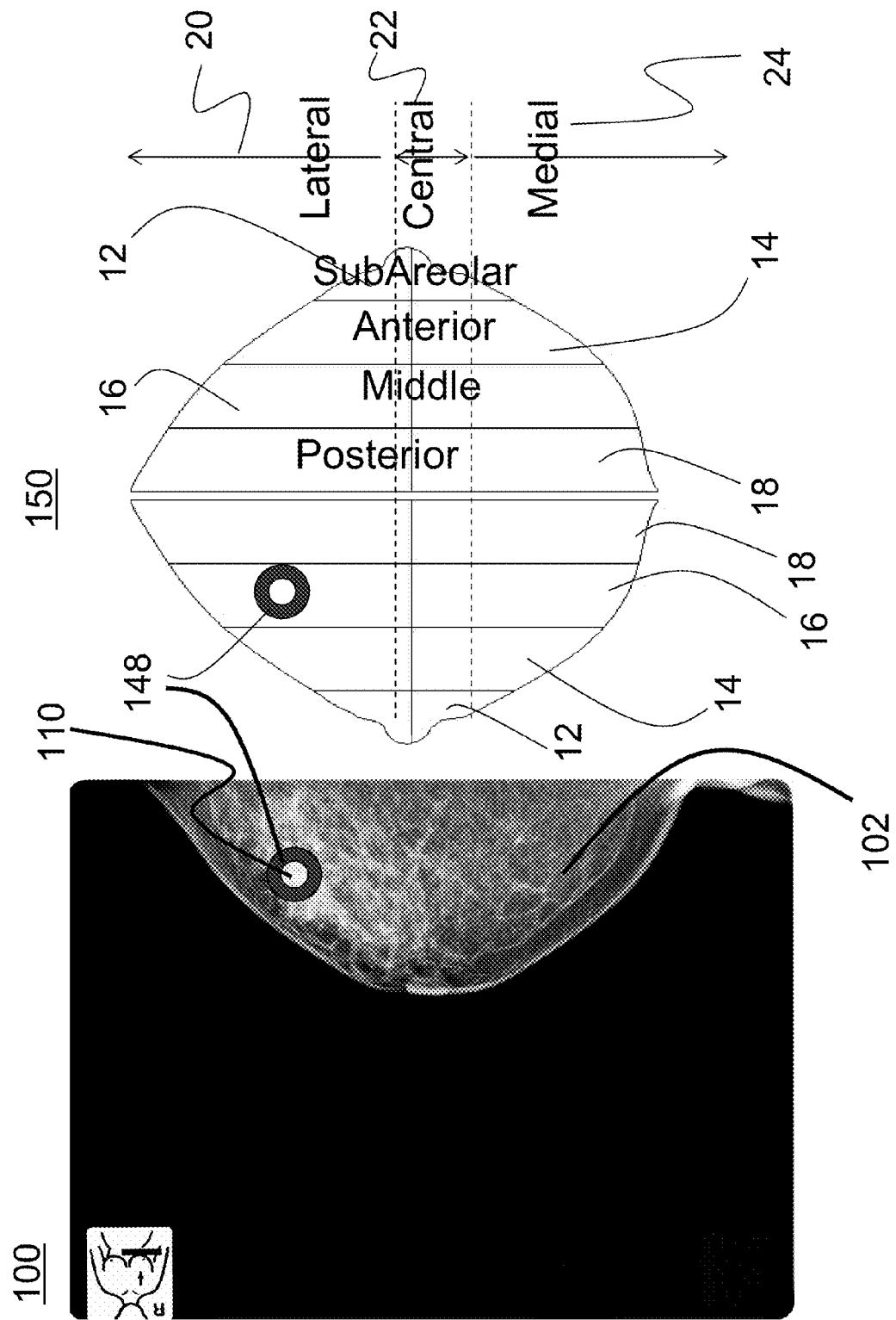
FIG. 7 depicts a mammography image displaying a location measurement of a lesion in a cranio-caudal view of the breast area, according to one embodiment of the invention.

In another embodiment of the invention, the location of a lesion can be determined in terms of an anatomical zone of a breast area, as illustrated by the cranio-caudal (CC) view of the mammography image in FIG. 7. The mammography image 100 includes a lesion 110 which has been identified and marked with a ring 148. The standard zones of a breast area are subareolar 12, anterior 14, middle 16 and posterior 18, as previously illustrated in FIG. 1 and repeated in the diagram 150 to the right of the mammography image 100. The breast area 102 is partitioned into the standard zones 12, 14, 16 and 18, after which the ring 148 marking the lesion will be classified as falling within an appropriate zone. In the embodiment of FIG. 7, the ring 148 falls within the middle zone 16. In the CC view of the breast area 102, the lesion can further be defined as falling within a lateral zone 20, central zone 22, or medial zone 24. In the embodiment in FIG. 7, the ring 148 identifying the lesion is classified as falling within the lateral zone 20. In the embodiment of FIG. 7, the location of the lesion 110, as represented by the ring 148, is mapped onto the breast diagram 150 to more clearly illustrate the zones to which the lesion belongs. However, in an alternate embodiment, the breast diagram 150 could be mapped onto the mammography image 100 and displayed to the user to demonstrate how the zones apply to the specific breast area 102 in the mammography image 100. If the lesion 110 falls between two zones, the system will indicate that the lesion is on the boundary between, for example, the middle and the posterior zone.

Figure 8:
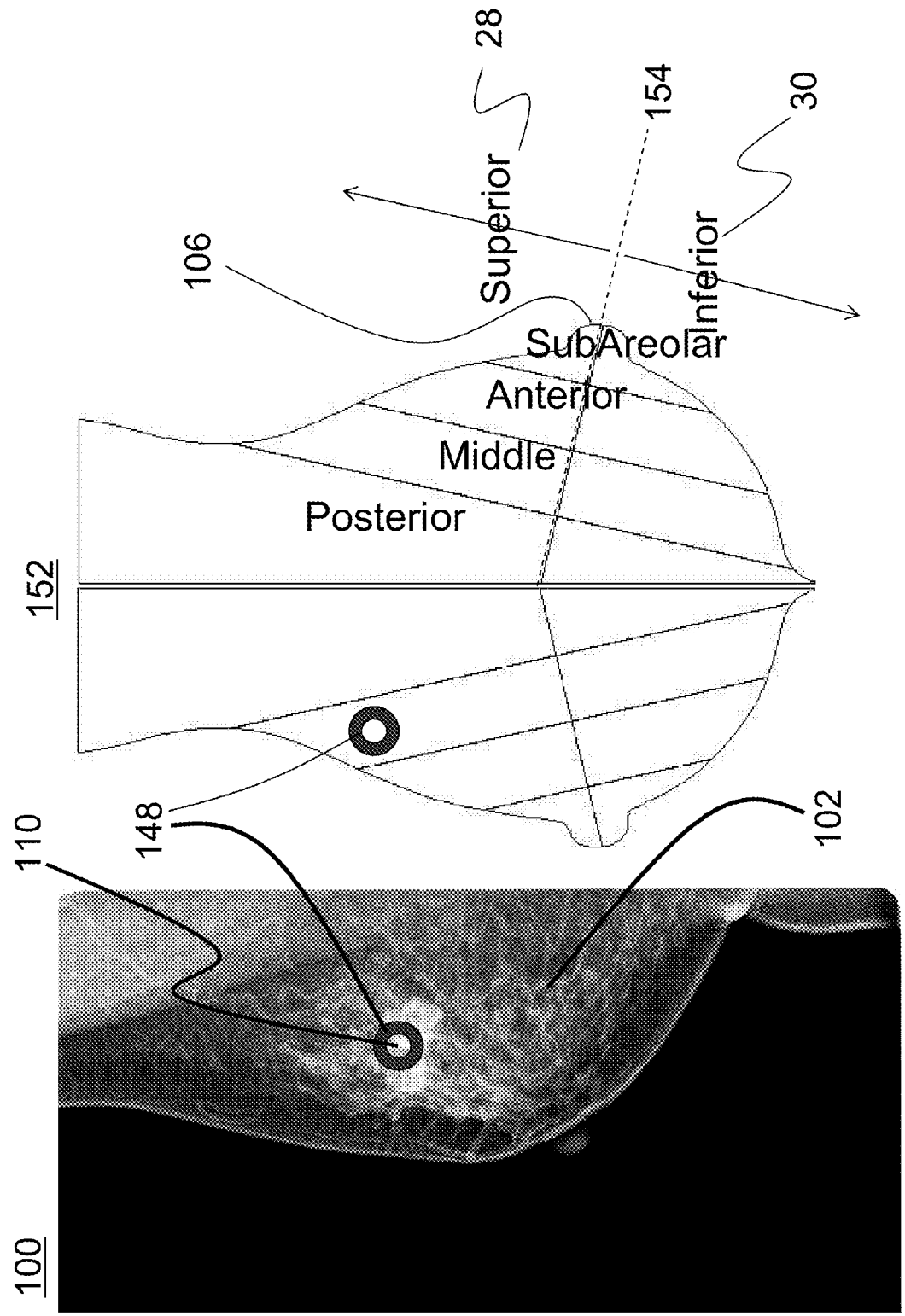
FIG. 8 depicts a mammography image displaying a location measurement of a lesion in a media-lateral view of the breast area, according to one embodiment of the invention.

In a further embodiment of the invention, the location of a lesion can be determined in terms of the anatomical zones of a breast area in a medio-lateral (ML) or medio-lateral oblique (MLO) view of the mammography image, as illustrated by the ML view in FIG. 8. The mammography image 100 includes a lesion 110 which has been identified and marked with a ring 148. In the ML or MLO view of the breast area 102, the lesion can further be defined as falling within a superior zone 28 or inferior zone 30, as illustrated in the breast diagram 152. In the embodiment in FIG. 8, the ring 148 identifying the lesion is classified as falling within the superior zone 28. In the embodiment of FIG. 8, the location of the lesion 110, as represented by the ring 148, is mapped onto the breast diagram 152 to more clearly illustrate the zones to which the lesion belongs. However, in an alternate embodiment, the breast diagram 152 could be mapped onto the mammography image 100 and displayed to the user to demonstrate how the zones apply to the specific breast area 102 in the mammography image 100.

It should be further noted that the location measurements are not limited to determining the location within the standard zones described above. Measurements may also be taken to determine whether a lesion falls within another anatomical region, such as a pectoral muscle or the "milky way" area, which is adjacent to the pectoral muscle and is a high-risk area for development of breast cancer.

The zones may be customized to each breast area 102 by determining a central line 154 of a breast area which corresponds to an axis of the breast area that runs through the nipple 106. The central line may be determined using the breast border and nipple location detected by the breast border and nipple location algorithm described above. One way of determining the central line is as follows: find two points on the breast border which are on the different sides of the nipple along the border and are at least 2 cm from the nipple; then find the middle point of the line segment which connects the two points on the breast border which are found in the previous step; finally, the line that is through the nipple and the middle point is determined as the central line The central line segment is the segment on the central line that is within the breast area.

The central line 154 is then used to define the superior zone 28 and inferior zone 30 in the ML/MLO view, as well as the central zone 22, lateral zone 20 and medial zone 24 in the CC view. For example, in the CC view image, the central zone 22 can be defined as the area which is within 1 cm from the central line. Then, the area above the Central zone is the Lateral zone, and the area below the Central zone is the Medial zone. In ML/MLO view image, the area above the central line is defined as the Superior zone, and the area below the central line is defined as the Inferior zone. In both views, the central line segment can be partitioned into four sections, such that the section right below the nipple has $1/7$ of the total length of the central line segment, and each of the other three sections has $2/7$ of the total length of the central line segment. The Sub-Areolar, Anterior, Middle and Posterior zones can then be defined by the perpendicular lines that divide the central line segment into the above mentioned four sections.

However, other methods may be used to define the zones of the breast, and are not beyond the scope of the embodiments described herein.

Figure 9:
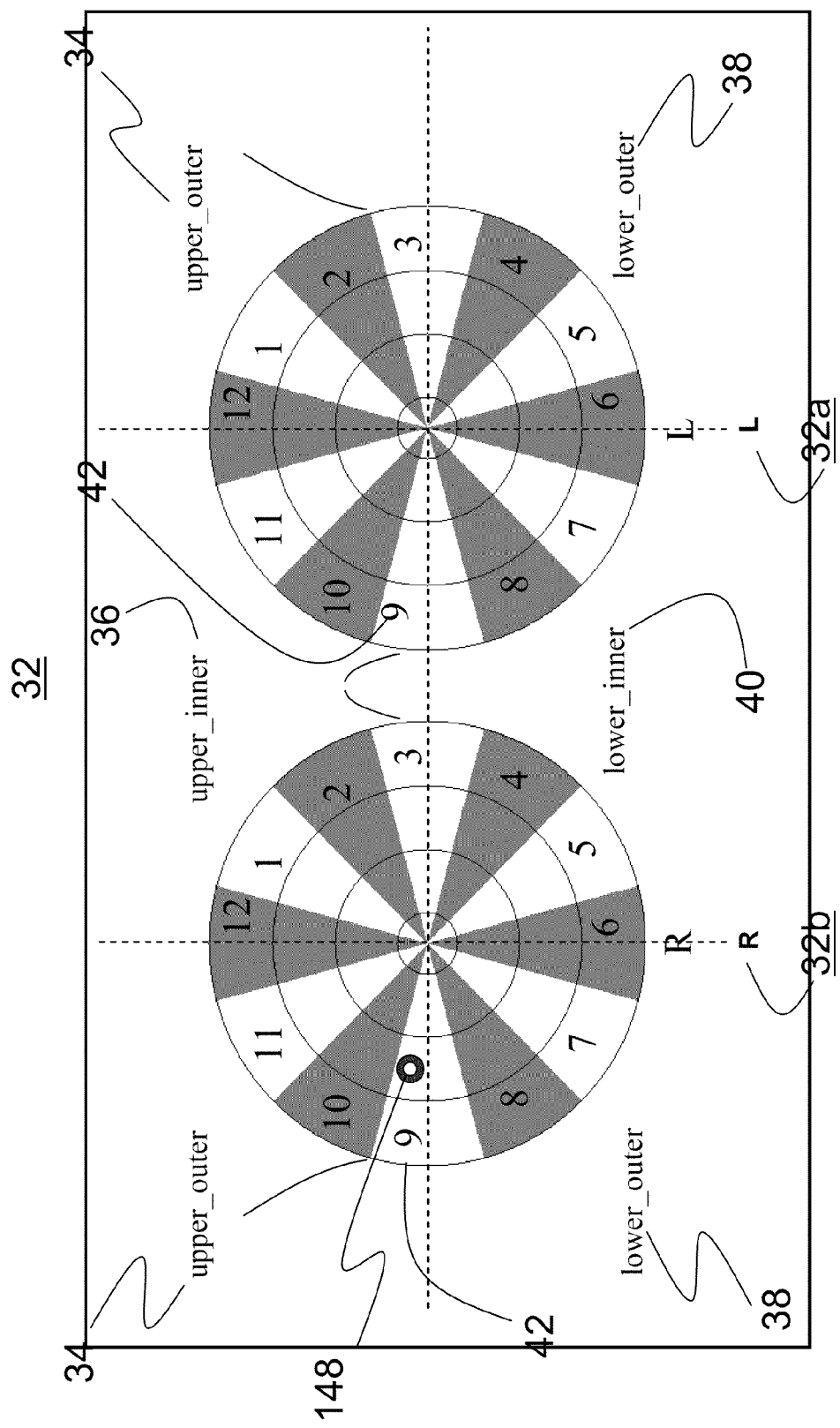
FIG. 9 depicts a diagram of a quadrant and clock location classification system for a breast area in a mammography image where the location of a lesion in a mammography image is mapped to the diagram, according to one embodiment of the invention.

FIG. 9 illustrates a further embodiment of the invention, where a quadrant and clock location measurement of a lesion can be determined, as long as both the CC and ML/MLO views are available. One method of determining the quadrant and clock location is to compute the distance of the lesion to the central line segment in the CC view image (Dcc) and ML view image (Dml), which are denoted by Dcc and Dml, respectively. In the breast diagram as shown in FIG. 9, let the angle between the line segment that connects the lesion and the nipple (i.e., the center of the clock face) and the horizontal line be denoted by A, then there exists a relationship where A=ArcTan(Dml/Dcc). The clock position can be readily determined according to the value of A.

Figure 10:
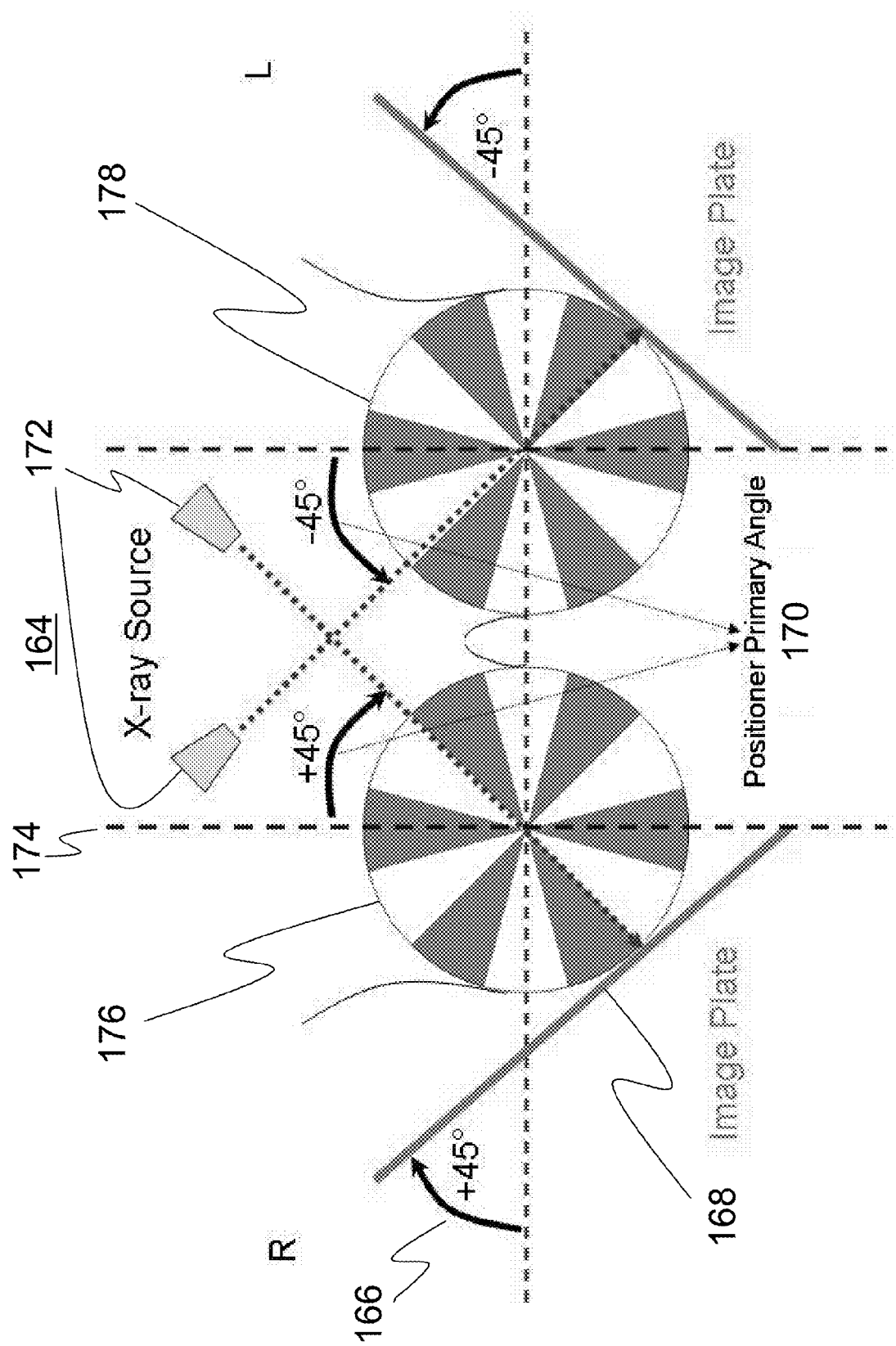
FIG. 10 depicts a diagram of a mammography image device illustrating the angles at which an X-ray source and image plate are configured to capture the mammography image of a left and right breast.

In the case of an MLO view image, a similar derivation can be performed where the angle of the image plate on the imaging device needs to be taken into consideration, as illustrated in the diagram of an imaging device 164 in FIG. 10. The angle 166 of the image plate 168 is equal to the Positioner Primary Angle 170, which is the angle between the X-ray source 172 and the vertical line 174, where as an example the Positioner Primary Angle 170 is 45 degrees. For the following calculation, let B denote the Positioner Primary Angle 170. It can be derived that, for the left breast 178, A=ArcTan(Dmlo/Dcc), where Dmlo=(Dml/Cos(B)−Dcc)/Tan(B) if Dcc>Dml/Cos(B), otherwise, Dmlo=Dml−Sin(B)−(Dcc−Dml−Cos(B))/Tan(B). Here Dml denotes the distance of the lesion to the central line segment in the MLO view image. A similar derivation applies to the right breast 176.

In the embodiment illustrated in FIG. 9, the location of the lesion 110 in FIGS. 7 and 8 is used to determine its quadrant position and clock location in the breast diagram 32. Based on the location of the lesion in the CC view and ML/MLO view image, the lesion 110 can be accurately mapped with the indicator ring 148 to the upper outer quadrant 34 at the 9 clock position 42. The lesion 110 represented by the indicator ring 148 can be mapped onto the breast diagram shown in FIG. 9 and the diagram can then be displayed to a user.

It will be appreciated by one of skill in the art that the systems and methods for the measurement and display of attributes of an object of interest in a medical image can also be applied to medical images other than a mammography image, in order to compare related medical images corresponding to other anatomical features or areas of the body. For example, lesions or abnormalities in medical images of humans or animals, including the brain, abdomen, arms or legs may need to be located and measured to determine the severity and risk posed by the abnormality, much as in the mammography analysis.

Figure 11A:
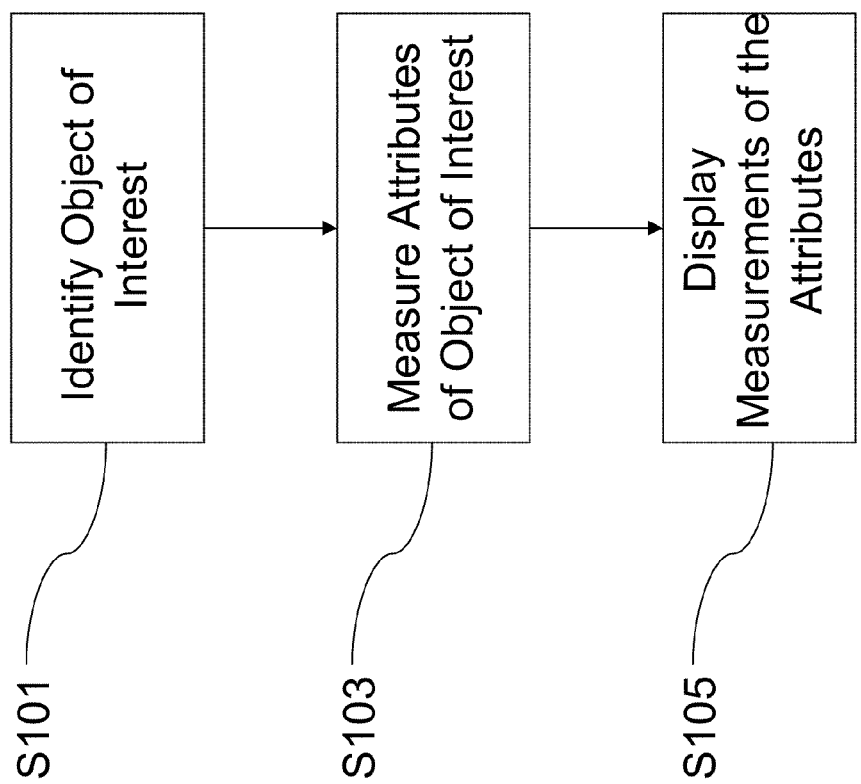
FIGS. 11A-11B depict methods of measuring and displaying attributes of an object of interest in a medical image, according to various embodiments of the invention.

FIG. 11A depicts a method for measurement of an object of interest in a medical image, according to one embodiment of the invention. In a first step S101, at least one object of interest in a medical image is identified. In a second step S103, the at least one attribute of the object of interest is automatically measured. Finally, in step S105, the measurements of the at least one attribute are displayed. The measurements may be displayed on the mammography image itself, or in another embodiment, the measurements may be displayed in a separate report document which compiles the measurements. The report document may be a spreadsheet, word processing document or report template that is used to clearly indicate the measurement results to a user without needing to view the image.

Figure 11B:
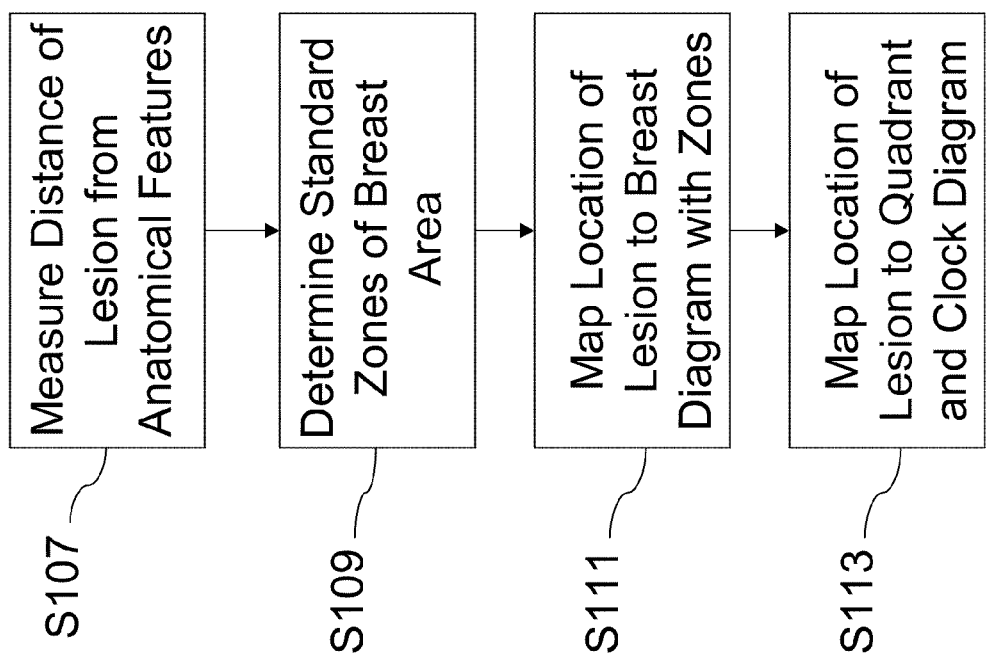

FIG. 11B depicts one embodiment of more detailed steps of a method of measuring at least one attribute of the object of interest, and specifically of measuring the location of a lesion in a breast area of a mammography image. In a first step S107, the distance of the lesion from at least one anatomical feature is measured. In a second step S109, standard zones of the breast area are determined based on the central axis of the breast area. In a next step S111, the location of the lesion is mapped onto a breast diagram to indicate the location of the lesion within the standard zones of the breast area. In a further step S113, the location of the lesion may be mapped to a quadrant and clock position diagram to more accurately illustrate the location of the lesion in the breast area.

Figure 12:
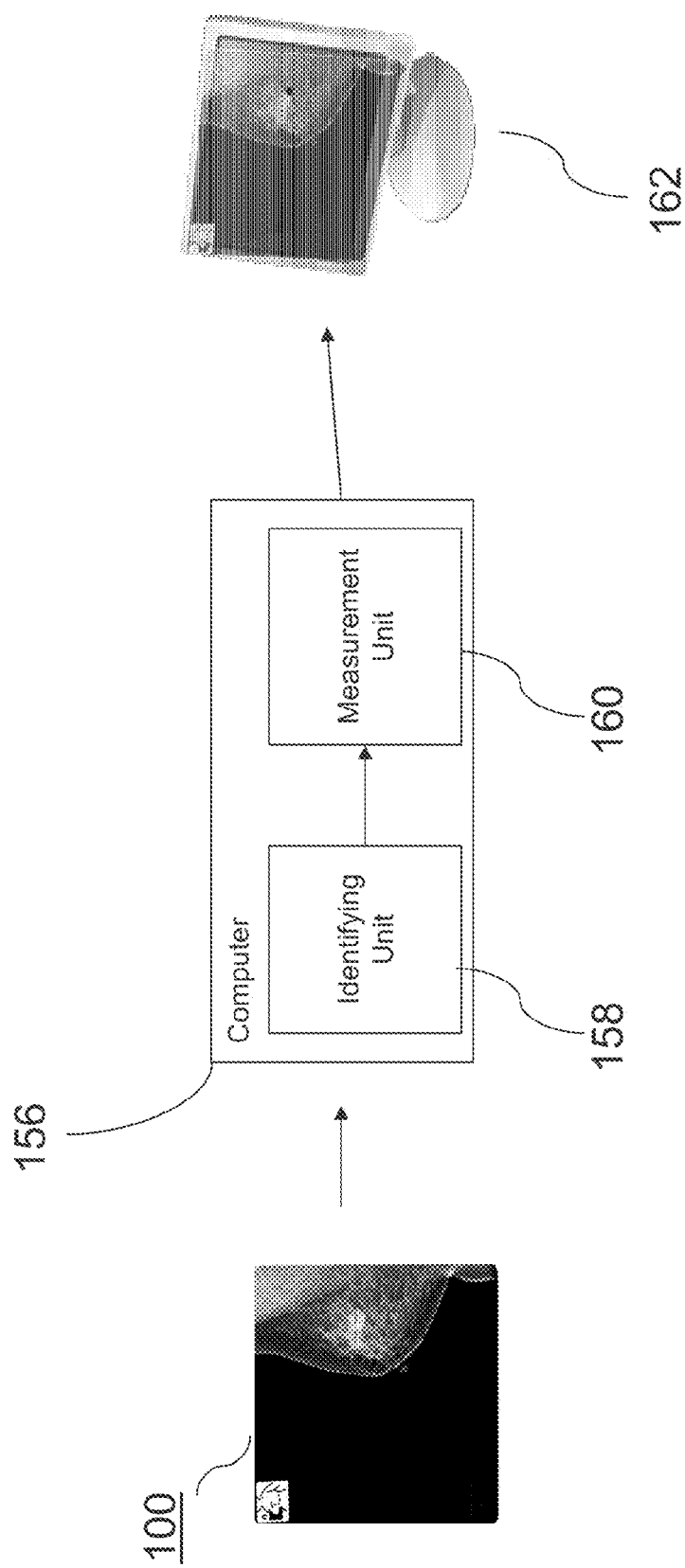
FIG. 12 illustrates a system for measuring and displaying or recording attributes of an object of interest in a medical image, according to one embodiment of the invention.

The inventive system may be implemented on a computer which receives the medical image and processes it according to the steps described above. The inventive system may be embodied as a computer program product or carried out by a combination of software and hardware. As illustrated in FIG. 12, a mammography image 100 may be input to the computer 156 where an identifying unit 158 identifies at least one object of interest in a breast area. A measurement unit 160 then measures at least one attribute of the object of interest. Finally, a display unit 162 displays the measurements of the attributes. In one non-limiting embodiment, the system provides the measurements as an option to the user, so that the user can compare the mapped measurements on the display to the original unaltered mammography image.

Figure 13:
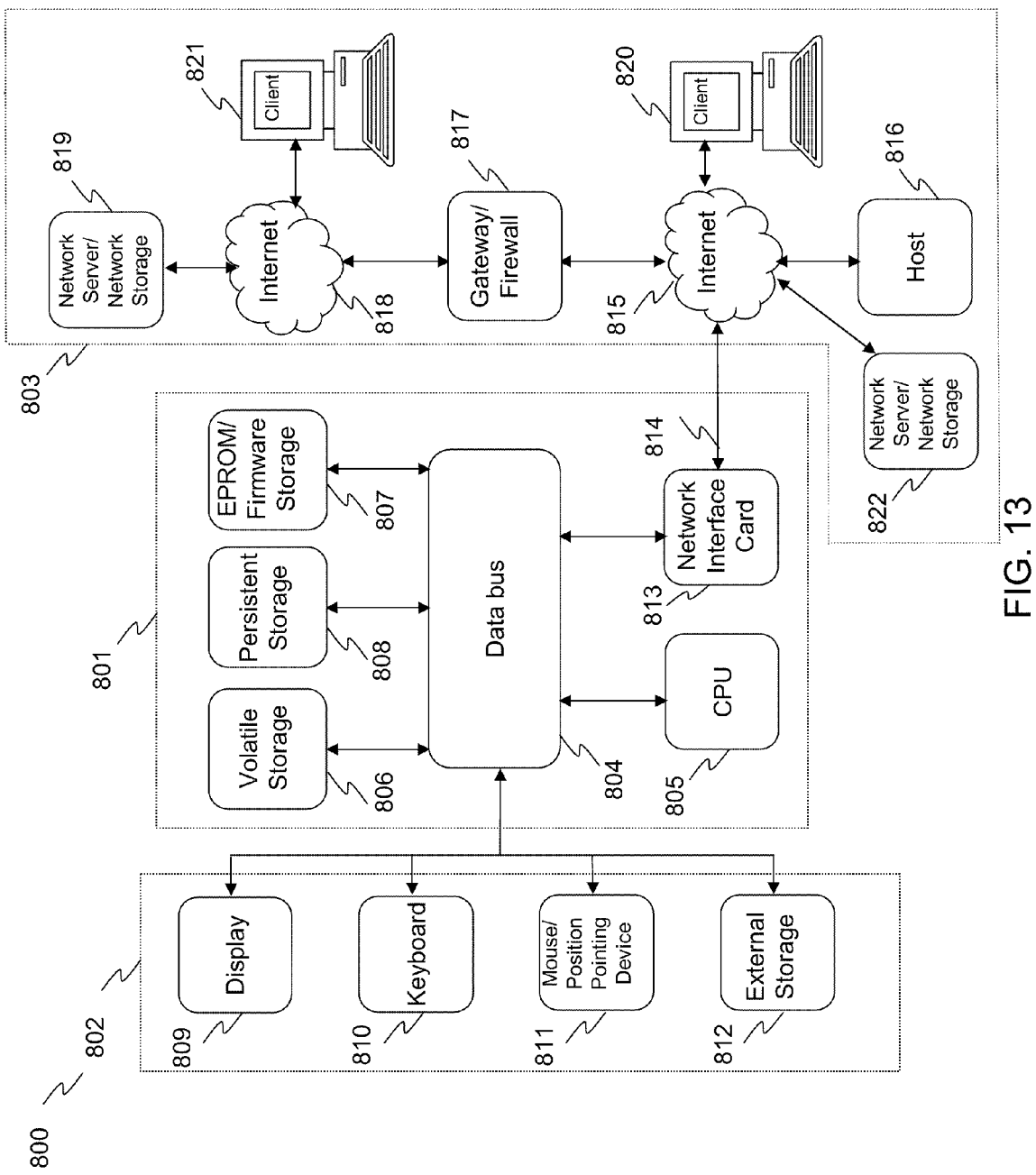
FIG. 13 illustrates an exemplary embodiment of a computer platform upon which the inventive system may be implemented.

FIG. 13 is a block diagram that illustrates an embodiment of a computer/server system 800 upon which an embodiment of the inventive methodology may be implemented. The system 800 includes a computer/server platform 801, peripheral devices 802 and network resources 803.

The computer platform 801 may include a data bus 804 or other communication mechanism for communicating information across and among various parts of the computer platform 801, and a processor 805 coupled with bus 801 for processing information and performing other computational and control tasks. Computer platform 801 also includes a volatile storage 806, such as a random access memory (RAM) or other dynamic storage device, coupled to bus 804 for storing various information as well as instructions to be executed by processor 805. The volatile storage 806 also may be used for storing temporary variables or other intermediate information during execution of instructions by processor 805. Computer platform 801 may further include a read only memory (ROM or EPROM) 807 or other static storage device coupled to bus 804 for storing static information and instructions for processor 805, such as basic input-output system (BIOS), as well as various system configuration parameters. A persistent storage device 808, such as a magnetic disk, optical disk, or solid-state flash memory device is provided and coupled to bus 801 for storing information and instructions.

Computer platform 801 may be coupled via bus 804 to a display 809, such as a cathode ray tube (CRT), plasma display, or a liquid crystal display (LCD), for displaying information to a system administrator or user of the computer platform 801. An input device 820, including alphanumeric and other keys, is coupled to bus 801 for communicating information and command selections to processor 805. Another type of user input device is cursor control device 811, such as a mouse, a trackball, or cursor direction keys for communicating direction information and command selections to processor 804 and for controlling cursor movement on display 809. This input device typically has two degrees of freedom in two axes, a first axis (e.g., x) and a second axis (e.g., y), that allows the device to specify positions in a plane.

An external storage device 812 may be connected to the computer platform 801 via bus 804 to provide an extra or removable storage capacity for the computer platform 801. In an embodiment of the computer system 800, the external removable storage device 812 may be used to facilitate exchange of data with other computer systems.

The invention is related to the use of computer system 800 for implementing the techniques described herein. In an embodiment, the inventive system may reside on a machine such as computer platform 801. According to one embodiment of the invention, the techniques described herein are performed by computer system 800 in response to processor 805 executing one or more sequences of one or more instructions contained in the volatile memory 806. Such instructions may be read into volatile memory 806 from another computer-readable medium, such as persistent storage device 808. Execution of the sequences of instructions contained in the volatile memory 806 causes processor 805 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 805 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 808. Volatile media includes dynamic memory, such as volatile storage 806. Transmission media includes coaxial cables, copper wire and fiber optics, including the wires that comprise data bus 804.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 805 for execution. For example, the instructions may initially be carried on a magnetic disk from a remote computer. Alternatively, a remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on the data bus 804. The bus 804 carries the data to the volatile storage 806, from which processor 805 retrieves and executes the instructions. The instructions received by the volatile memory 806 may optionally be stored on persistent storage device 808 either before or after execution by processor 805. The instructions may also be downloaded into the computer platform 801 via Internet using a variety of network data communication protocols well known in the art.

The computer platform 801 also includes a communication interface, such as network interface card 813 coupled to the data bus 804. Communication interface 813 provides a two-way data communication coupling to a network link 814 that is connected to a local network 815. For example, communication interface 813 may be an integrated services digital network (ISDN) card or a modem to provide a data communication connection to a corresponding type of telephone line. As another example, communication interface 813 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 813 sends and receives electrical, electromagnetic or optical signals that carry digital data streams representing various types of information.

Network link 813 typically provides data communication through one or more networks to other network resources. For example, network link 814 may provide a connection through local network 815 to a host computer 816, or a network storage/server 817. Additionally or alternatively, the network link 813 may connect through gateway/firewall 817 to the wide-area or global network 818, such as an Internet. Thus, the computer platform 801 can access network resources located anywhere on the Internet 818, such as a remote network storage/server 819. On the other hand, the computer platform 801 may also be accessed by clients located anywhere on the local area network 815 and/or the Internet 818. The network clients 820 and 821 may themselves be implemented based on the computer platform similar to the platform 801.

Local network 815 and the Internet 818 both use electrical, electromagnetic or optical signals that carry digital data streams. The signals through the various networks and the signals on network link 814 and through communication interface 813, which carry the digital data to and from computer platform 801, are exemplary forms of carrier waves transporting the information.

Computer platform 801 can send messages and receive data, including program code, through the variety of network(s) including Internet 818 and LAN 815, network link 814 and communication interface 813. In the Internet example, when the system 801 acts as a network server, it might transmit a requested code or data for an application program running on client(s) 820 and/or 821 through Internet 818, gateway/firewall 817, local area network 815 and communication interface 813. Similarly, it may receive code from other network resources.

The received code may be executed by processor 805 as it is received, and/or stored in persistent or volatile storage devices 808 and 806, respectively, or other non-volatile storage for later execution. In this manner, computer system 801 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the invention. For example, the described software may be implemented in a wide variety of programming or scripting languages, such as Assembler, C/C++, perl, shell, PHP, Java, etc.

Although various representative embodiments of this invention have been described above with a certain degree of particularity, those skilled in the art could make numerous alterations to the disclosed embodiments without departing from the spirit or scope of the inventive subject matter set forth in the specification and claims. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. Also, various aspects and/or components of the described embodiments may be used singly or in any combination in the computerized storage system. It is intended that all matter contained in the above description or shown in the accompanying drawings shall be interpreted as illustrative only and not limiting.

What is claimed is:

1. A method for measurement of an object of interest in a medical image, the method comprising:
   identifying at least one object of interest in a medical image, wherein the object of interest is a lesion in a breast area, and wherein the medical image is a mammography image;
   automatically measuring at least one attribute of the object of interest, wherein the attribute is a distance from the lesion to at least one anatomical feature; and
   determining quadrant and clock zones of the breast area and displaying a location of the lesion on a quadrant and clock zone diagram.

2. The method of claim 1, wherein the measurements are displayed on a report.

3. The method of claim 1, wherein the measurements are displayed on the medical image.

4. The method of claim 1, wherein the measurements are displayed on an anatomical diagram.

5. The method of claim 1, further comprising determining standard zones of the breast area and displaying a location of the lesion on a standard zones diagram.

6. The method of claim 1,
   wherein when both a cranio-caudal view image and a medio-lateral view image are available, the determining of the quadrant and clock zones of the breast area includes determining a clock location of the lesion according to a value of $A=\text{ArcTan}(Dml/Dcc)$, and
   wherein Dcc and Dml respectively denote distances of the lesion to a central line segment in the cranio-caudal view image and medio-lateral view image, and A denotes an angle between a line segment that connects the lesion and a nipple, and a horizontal line.

7. The method of claim 1, further comprising determining standard zones of the breast area and displaying the standard zones of the breast area onto the mammography image to display the location of the lesion with respect to the standard zones on the mammography image.

8. The method of claim 1, wherein when a cranio-caudal view image and a medio-lateral oblique view image are available, the determining of the quadrant and clock zones of the breast area includes:
   determining the clock location of the lesion according to a value of $A=\text{ArcTan}(Dmlo/Dcc)$, where $Dmlo=(Dml/\text{Cos}(B)-Dcc)/\text{Tan}(B)$ if $Dcc>Dml/\text{Cos}(B)$, otherwise, $Dmlo=Dml\cdot\text{Sin}(B)-(Dcc-Dml\cdot\text{Cos}(B))/\text{Tan}(B)$,
   wherein B denotes a Positioner Primary Angle, Dcc and Dml respectively denote distances of the lesion to a central line segment in the cranio-caudal view image and medio-lateral oblique view image, and A denote an angle between a line segment that connects the lesion and a nipple, and a horizontal line.

9. A system for measurement of an object of interest in a medical image, the system comprising:
   an identification unit which identifies at least one object of interest in a medical image, wherein the object of interest is a lesion in a breast area, and wherein the medical image is a mammography image;
   a measurement unit which automatically measures at least one attribute of the object of interest, wherein the attribute is a distance from the lesion to at least one anatomical feature, and wherein the measurement unit determines quadrant and clock zones of the breast area; and
   a mapping unit which maps the quadrant and clock zones of the breast area onto the mammography image to display the location of the lesion on the mammography image with respect to the quadrant and clock zones.

10. The system of claim 9, further comprising a display unit which displays the measurements of the at least one attribute.

11. The system of claim 10, wherein the measurements are displayed onto the medical image.

12. The system of claim 9, wherein the measurement unit measures at least one additional attribute which includes an area of at least one lesion.

13. The system of claim 9, wherein the measurement unit measures at least one additional attribute which includes a width and height of a cluster of lesions.

14. The system of claim 9, wherein the measurement unit measures at least one additional attribute which includes the number of lesions in a cluster of lesions.

15. The system of claim 9, wherein the measurement unit further determines standard zones of the breast area, and wherein the mapping unit maps the standard zones of the breast area onto the mammography image to display the location of the lesion on the mammography image with respect to the standard zones.

16. The system of claim 9, wherein the measurement unit further determines quadrant and clock zones of the breast area, and wherein the mapping unit maps the quadrant and clock zones of the breast area onto the mammography image to display the location of the lesion on the mammography image with respect to the quadrant and clock zones, and
   wherein when both a cranio-caudal view image and a medio-lateral view image are available, the mapping unit maps the lesion with respect to the clock zones according to a value of $A=\text{ArcTan}(Dml/Dcc)$, and wherein Dcc and Dml respectively denote distances of the lesion to a central line segment in the cranio-caudal view image and medio-lateral view image, and A denote an angle between a line segment that connects the lesion and a nipple, and a horizontal line.

17. A computer program product for measurement of an object of interest in a medical image, the computer program product embodied on a non-transitory computer readable medium and when executed by a computer, performs the method comprising:
   identifying at least one object of interest in a medical image, wherein the object of interest is a lesion in a breast area, and wherein the medical image is a mammography image;
   automatically measuring at least one attribute of the object of interest, wherein the attribute is a distance from the lesion to at least one anatomical feature; and
   determining quadrant and clock zones of the breast area and displaying a location of the lesion on a quadrant and clock zone diagram.

* * * * *